United States Patent [19]

Lang

[11] Patent Number: 5,191,611
[45] Date of Patent: * Mar. 2, 1993

[54] METHOD AND APPARATUS FOR PROTECTING MATERIAL ON STORAGE MEDIA AND FOR TRANSFERRING MATERIAL ON STORAGE MEDIA TO VARIOUS RECIPIENTS

[76] Inventor: Gerald S. Lang, 812 Downs Dr., Silver Spring, Md. 20904

[*] Notice: The portion of the term of this patent subsequent to Nov. 12, 2008 has been disclaimed.

[21] Appl. No.: 642,889

[22] Filed: Jan. 18, 1991

Related U.S. Application Data

[63] Continuation-in-part of Ser. No. 626,409, Dec. 14, 1990, Pat. No. 5,065,429, which is a continuation of Ser. No. 358,263, May 30, 1989, abandoned, which is a continuation-in-part of Ser. No. 331,800, Apr. 3, 1989, abandoned.

[51] Int. Cl.$^5$ ............................................. H04K 1/00
[52] U.S. Cl. ........................................ 380/25; 380/23; 380/4
[58] Field of Search ................ 380/4, 18, 23, 25, 24, 380/49, 50; 364/246.6, 246.9, 969.3, 969.4; 358/435, 436, 442, 438, 439; 379/100; 395/425, 725

[56] References Cited

U.S. PATENT DOCUMENTS

| | | | |
|---|---|---|---|
| 4,652,698 | 3/1987 | Hale et al. | 380/25 X |
| 4,900,902 | 2/1990 | Sakakibara | 380/25 X |
| 4,974,254 | 11/1990 | Perine et al. | 358/435 X |
| 4,989,244 | 1/1991 | Naruse et al. | 380/23 X |
| 4,994,926 | 2/1991 | Gordon et al. | 358/436 X |
| 5,065,429 | 11/1991 | Lang | 380/25 |
| 5,068,888 | 11/1991 | Scherk et al. | 358/435 X |

Primary Examiner—Tod R. Swann
Attorney, Agent, or Firm—Hoffman, Wasson & Gitler

[57] ABSTRACT

A method and apparatus for granting privileges for securely and selectively retrieving material such as data and databases, messages and other textual information, graphics, tables, analogs such as maps, facsimiles (FAX) of all manner of transmitted materials, audio such as voice or speech and music, video, images, and photographs, provided on storage media utilizing information encoded in the storage media. The storage media are included in one or more reading devices associated with a computer or computers. A storage retrieval device, such as a smart card, is used in conjunction with the computer to determine whether information retrieval by a particular user to specific storage media is granted. The storage media can be sub-divided into a plurality of logical zones and access to all or a portion of the material on the storage media is granted based upon the logical zones to which the user is allowed information retrieval. Information provided on the storage media would include access/information management control device such as index table listing the security identification code, the logical zones to which a particular user is assigned as well as a personal security key used in conjunction with a personal security key provided in the personal access device such as a smart card. The interaction between the user's personal accessing device and the access/information management control device provided on the storage media determine if information retrieval is granted as well as specific information retrieval privileges accorded to the user. The present invention can be embedded in another device or system, such as a facsimile system which would allow a user access to only those messages specifically directed to him. Furthermore, the invention can be used in local area networks, wide area networks, point-to-point communication networks, as well as store-and-forward systems.

26 Claims, 9 Drawing Sheets

| LOGICAL ZONES | ZONE ACCESS CODES | SECURITY IDENTIFICATION CODE | |
|---|---|---|---|
| | | SYSTEM IDENTIFICATION CODES | PERSONAL SECURITY KEYS |
| 1, 9, 26 | 01 | 000000 ⋮ 087144 | XXXX ⋮ XXXX |
| 1, 9, 26, 99 | 02 | 000000 ⋮ 029142 | XXXX ⋮ XXXX |
| 33 | 27 | 000000 ⋮ 006104 | XXXX ⋮ XXXX |
| 10, 11 | 33 | 000010 ⋮ 000018 | XXXX ⋮ XXXX |
| 10, 11, 99 | 34 | 550000 ⋮ 550003 | XXXX ⋮ XXXX |
| 46, 47, 48, 54 | 81 | 300000 ⋮ 308156 | XXXX ⋮ XXXX |
| <u>36</u> | <u>32</u> | <u>34</u> | <u>38</u> |

FIG.4

| LOGICAL ZONES | ZONE ACCESS CODE | SYSTEM ID CODES | PERSONAL SECURITY KEYS |
|---|---|---|---|
| 17, 23, 24, 87 | B7 | AAA30 | 13e47a00 |
| | | AAA30A | 4344b3c7 |
| | | AA30AA | 225d43ae |
| | | A30AAA | 559c2030 |
| | | 30AAAA | 1209b88c |
| | | 0AAAA3 | 3b020b37 |
| | | BB7426 | 94a99b23 |
| | | B72677 | 1029b932 |

FIG.9

METHOD AND APPARATUS FOR PROTECTING MATERIAL ON STORAGE MEDIA AND FOR TRANSFERRING MATERIAL ON STORAGE MEDIA TO VARIOUS RECIPIENTS

RELATED APPLICATIONS

This application is a continuation-in-part application of Ser. No. 07/626,409, filed Dec. 14, 1990, now U.S. Pat. No. 5,065,429, which is a continuation of Ser. No. 07/358,263, filed May 30, 1989, now abandoned, which is a continuation-in-part application of Ser. No. 07/331,800, filed Apr. 3, 1989, now abandoned.

BACKGROUND OF THE INVENTION

In the approximately 45 years since the development of the first crude computer, our society has seen a virtual explosion of information storage as well as information processing machines. With the advent of the personal computer, this information explosion has permeated virtually every facet of our daily lives. In the business community, personal computers are used to store and process a large amount of material which was previously maintained in paper files. Similarly, many homes now include a personal computer for the storage of personal data as well as the processing of other types of information.

During the infancy of the computer industry, when only very large companies or the government were able to afford to purchase and maintain relatively large mainframe computers provided with bulky storage media, security for access to this storage media was generally maintained by limiting access to the area in which the computer was stored as well as access to the computer itself. Typically, an authorized user was issued nothing, a computer password, or security card allowing access to the computer and any files included in the storage media utilized with the company. In other words, the person attempting to gain access to the computer must possess the knowledge and/or the tools of the authorized user. However, used in the context of today's smaller personal computers and the utilization of relatively small, portable storage media, this type of security program has proven to be inadequate. For example, if the password or security card would be stolen from the authorized personnel, computer access to an unauthorized person would be granted. Additionally, since the storage media is relatively small in size and, due to the need for allowing access to the material provided on this storage media to various authorized personnel remote from one another, it is important that a system be developed in which the storage media can be sent to various locations without the security of the material on the media being compromised.

In this context, several methods have been developed for protecting access to software programs stored on storage media such as read-only-memory (ROM) Examples of these devices are discussed in U.S. Pat. No. 4,757,468 issued to Domenik et al and U.S. Pat. No. 4,740,890 issued to William. Both of these patents describe apparatuses for protecting software programs which will be distributed on a magnetic disk or similar storage media. Verification routines provided directly on the storage media are utilized to protect access to the entire program. However, no device has been developed in which storage media itself is utilized to protect non-program information, such as textual material, data, graphs, or other digitally stored material. Furthermore, since various personnel may be granted access to only selective material which would be on the storage disk, the scenarios described with respect to the Domenik et al and William patents would not be applicable to an instance in which various personnel would be granted access to only a limited portion of the material provided on the storage media. This is important since only a single master print of any entire file may be manufactured and distributed to various personnel with limited access of material granted to each of the personnel. If limiting access was not possible, various storage devices and quite possibly many more storage devices, must be manufactured and given to each of the personnel, based upon the section of the material to which each individual has been granted access.

Similarly, no device was discovered in which the storage media, provided with software program information thereon, is used to allow access to only a portion of the program information, or one or more programs from a plurality of programs.

SUMMARY OF THE INVENTION

The deficiencies of the prior art are overcome by the present invention which is directed to a method and system for granting complete or limited access to information stored in a storage medium or media utilizing information physically stored in the storage medium or media. The particular storage medium or media are included in an appropriate reader mechanism which is connected to a personal computer, minicomputer, or a mainframe computer having a means for entering personal and system access data therein, such as a keyboard. The storage medium can be any permanent or erasable item such as an optical disk, a CD ROM, a WORM, a floppy disk, a disk pack, or an integrated circuit card such as a smart card or memory card), an optical card, as well as special items such as a BERNOULLI box disk, or any other type of storage medium. However, for simplicity's sake, we shall describe the present invention with respect to a CD ROM storage medium. Additionally, a storage accessing device (used interchangeably herein with the following terms—personal accessing device (PAD) and smart card) provided with an encrypted or non-encrypted personal security key as well as personal identification code is included to allow an individual access to the storage medium or media. Furthermore, for ease of understanding the present invention, we shall describe the storage accessing device with respect to a SMART card that does not require an electronic, optical, capacitive or magnetic reader to receive or transmit personal and system data.

Initially, when the CD ROM is mastered, the information storage portion of the CD ROM is broken up according to a predetermined classification system and stored in various logical zones, each of which contains a discrete set of databases or other material therein. There may be one or more logical zones recorded on the CD ROM. Users, based on their need to know, as well as the sensitivity of the material to be stored on the CD ROM, are accorded access privileges that correspond to previously designated logical zones. Based on an organization's or person's storage classification system, materials are categorized and stored in the corresponding logical zones when the CD ROM is manufactured. Therefore, to grant each user information retrieval privileges, a determination is made as to which logical zones each particular user would be allowed access. Based upon this determination, each user is assigned a particular zone access code (ZAC) which is translated into corresponding logical zones using an access/information management control device, such as an index table stored in the CD ROM. At the same time, paired to the ZAC, is a list of authorized system identification codes, each with its assigned unique Personal Security Key (PSK). Each authorized user is assigned a ZAC and a unique system identification code. For extremely secure applications, the intended user's biometric coded information can be paired with the personal security key. The access/information management control device would include the ZAC, the system identification code, the personal security key code, plus the possible use of biometric coded information, as well as the logical zones assigned to the ZAC for each user. This device can be included on the CD ROM in the form of an index table when it is manufactured.

For example, when an individual wishes to gain access to the CD ROM, the user would correctly enter his particular personal identification code in the aforementioned smart card PAD to activate it, which would then display both the ZAC as well as the system identification code in either encrypted or non-encrypted form. The user, utilizing a keyboard, would enter this code into the computer which then compares the decrypted or encrypted codes obtained from both the smart card and CD ROM and if a match is obtained, would then verify that this particular system identification (ID) code is proper and that material this accessor seeks access to is stored on the storage medium or media. The computer then retrieves the paired personal security key (SK). The computer would then generate a random number which is displayed upon its screen to serve as a challenge to the personal accessing device (smart card). The user would input this random number into the smart card via its keypad. The smart card as well as the computer are provided with a particular encryption/decryption algorithm (alternately a security processor chip). Both the computer and the smart card would simultaneously compute a response to the challenge code (random number) and this response is displayed on the smart card's display screen. This displayed response is then entered into the computer through its keyboard to determine whether there is a match. If a match is shown to have occurred, the computer will then display all the material names (directories) therein for the logical zones which access privileges have been granted and allow the user access to these logical zones provided in the storage medium or media.

Further, the system then releases the System Security Key (SSK), or alternatively the security key paired with each logical zone, which is transferred to the information processing device's or computer's volatile random access memory (RAM) or to the security processor chip board installed in the information processing device or computer. The system security key or logical zone security key is used to decrypt all the privileged encrypted material transferred from the CD ROM. The information processing device's or computer's copy of the system security key or logical zone security key(s) is destroyed when the information processing device or computer loses its power or if said device or computer concludes its CD ROM activities and is then used for other applications. Each CD ROM has its own system security key and/or logical zone security key(s) recorded on it which would be retrieved by the information processing device or computer for use during search and retrieval and indexing activities when authorized user access is established. Alternatively, the decryption algorithm can be stored on the smart card and the decryption of information would take place in the smart card and this information is then transferred to the computer for viewing and processing.

The CD ROM search and retrieval and indexing program can be stored either on items such as floppy disks to be used at the time of CD ROM operation, on the information processing device's or computer's permanent memory, on the CD ROM, or on both the CD ROM and smart card PAD.

If a type of contact or contactless smart card is used which requires a non-human reader, the operation is very similar to the activities described above. The personal identification code can be entered via the computer keyboard or via a keypad on the PAD reader. The entry of the correct personal identification code enables the smart card to start transmission and the paired ZAC and system identification codes which are stored in the smart card processor's memory (e.g., EPROM or EEPROM) are transmitted to the computer. Based on the transmitted ZAC, the access/information management control device such as an index table on the storage media is searched to determine if there is a match. If the corresponding ZAC is not stored in the access/information management control device of the storage medium or media, a message is displayed on the computer screen that access will not be granted. If there is a match of the ZAC's, then the associated system identification codes stored on the storage medium or media are accessed until an exact match is found. If no match of the system identification code is found, the accessor will not be granted access. If an exact match is found, the personal security key paired with the user's system identification code is retrieved by the computer and is used to operate upon a randomly computer generated number. At the same time, the random number is also transmitted to the smart card PAD reader which inputs the number to the smart card. The authorized user's smart card PAD has both an identical or cooperating encryption/decryption algorithm or processor chip and personal security key to that of the information processing device or computer and the CD ROM. The smart card operates on the random number using its internally stored personal security key and transmits the result through the PAD reader to the computer or information processing device. The information processing device or computer uses an encryption/decryption algorithm or processor chip in its process to compare the results of both operations upon the random number. If a match occurs, the accessor's authorized status is ascertained and the predetermined access privileges are granted.

With respect to the software program application, while prior art devices include verification routines provided on the storage media to protect access to the entire program, no prior art device, however, limits access to only a portion of this program, or access to one program from two or more stored programs. Additionally, access can be provided to one or more programs from a plurality of programs. To prevent unauthorized display and retrieval of material, the personal accessing device can be programmed to permit metering such as only one download or a specific number of downloads of the portion of the program or one or more programs from a plurality of programs on the media allowed access by the user.

Furthermore, the present invention can have application when the computer is embedded in another device or system. For example, if the computer is provided in a facsimile system, material recovered by the facsimile device or system could be accessed only by the proper use of an individual's PAD.

Additionally, the present invention is not limited to be used within a single stand-alone computer, processor or microprocessor, but could also be used in a local area network (LAN), wide area network (WAN) or point-to-point (PTP) communication network.

BRIEF DESCRIPTION OF THE DRAWINGS

These and other advantages of the objects of the invention can be understood from the following detailed description of a preferred embodiment of the invention described in conjunction with the drawings wherein:

FIG. 4 is a diagram showing multiple entries or user accounts in the index table of a storage medium;

FIG. 9 is a diagram showing paired security keys with multiple user system identification codes (SIC) in the sample index table of a storage medium for one user.

DETAILED DESCRIPTION OF THE DRAWINGS

The present invention is directed to a method apparatus for granting access to information such as data and databases, messages and other textual information, graphics, tables, analogs such as maps, facsimiles (FAX) of all manner of transmitted materials, audio such as voice or speech and music, video, images, photographs, or the like provided on a storage medium or media such as a CD ROM, or erasable optical and magnetic media, or the like. Contrary to most methods and devices for allowing access to the material provided on a storage medium or media, wherein access is granted to a computer included a storage media file, the present invention grants access to the storage media itself or a portion thereof based upon an access/information management control device such as an index table included directly on the storage medium or media. The storage medium, for example purposes hereinafter a CD ROM, can be, if desired, divided into a plurality of logical zones. Based upon a user's need to know, access can be granted to all of the logical zones or to one or a particular combination of logical zones. Based upon these logical zones, the user is assigned a zone access code, along with a system identification code or codes, and a personal security key or keys. For a more secure system, biometric coded information can also be assigned as part of the personal identifier. This information for each of the users is stored on the CD ROM along with the translation of each zone access code into its corresponding logical zone(s). Additionally, each of the users is assigned a Personal Identification Code (PIC) for use with the smart card PAD to corroborate the user's identity and thereafter enable the smart card to initiate the challenge-response dialogue with the storage medium or media.

Figure 1:
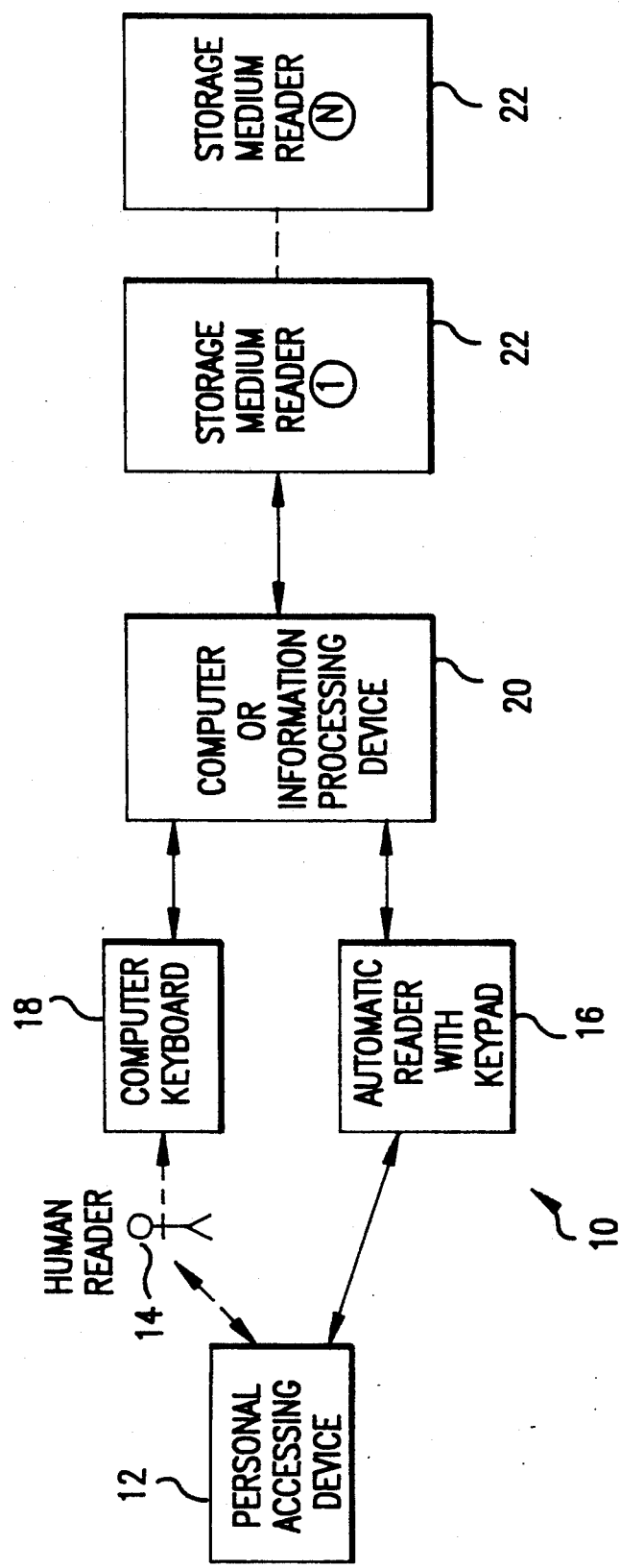
FIG. 1 is a block diagram of the system of the present invention.
Figure 2:
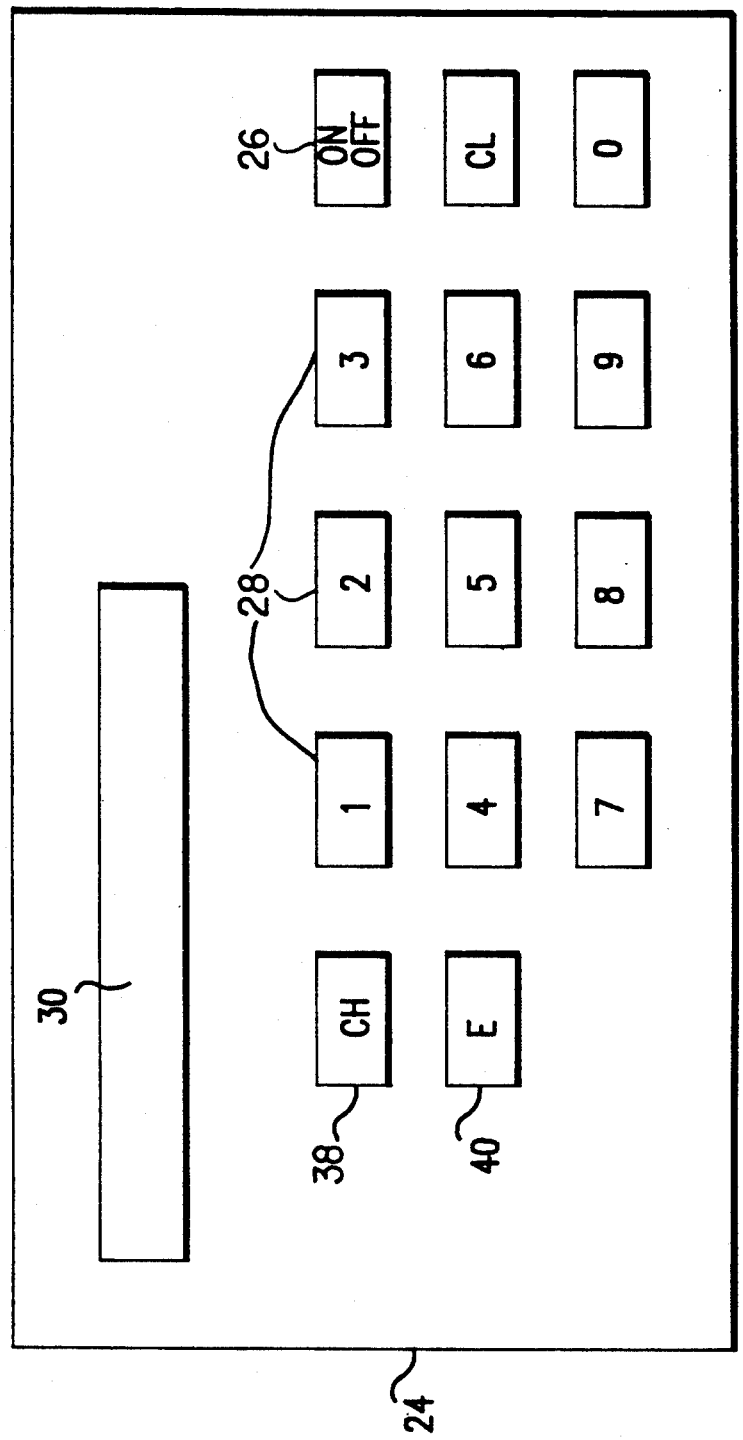
FIG. 2 is a diagram of a typical personal accessing device.
Figure 3:
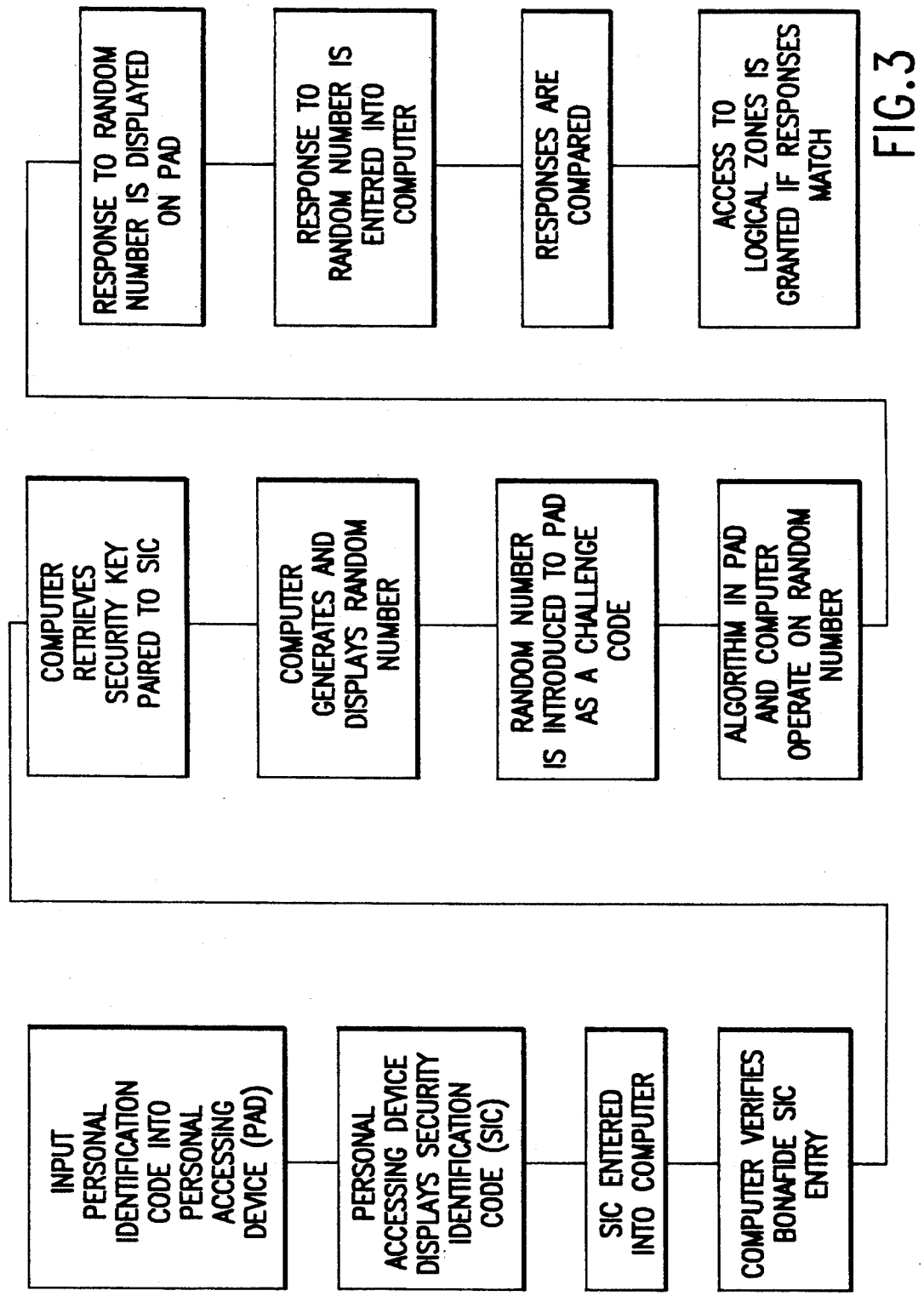
FIG. 3 is a flow diagram of a method of obtaining information retrieved of material on the storage media based upon the present invention.

Once all of the relevant information is directly provided for a user within the CD ROM as well as a Personal Accessing Device (PAD) such as a smart card, a user can gain access to privileged storage media contents utilizing the system 10 illustrated with respect to FIG. 1. As shown therein, access to the storage media CD ROM is provided utilizing a personal accessing device 12. This device 12 can be various configurations of devices. As a smart card, it can be the type of smart card which would automatically interface with an automatic reader 16 connected to a computer or information processing device 20, or through the intervention of a human reader 14 with a keyboard 18. The computer or information processing device would run the gamut from equipment such as microcomputers, to minicomputers to mainframe computers. For illustrative purposes only, we shall discuss the present invention with respect to a smart card PAD 24 shown in FIG. 2 with a keypad and liquid crystal display. An ON/OFF key 26 of the smart card 24 is depressed and the smart card is turned on. Inactivity within a predetermined time period will turn the PAD off automatically. Additionally, it is noted that the smart card may use an encryption/decryption algorithm and/or processor chip, or any other encryption device if a security key device is employed with the CD ROM. Once the smart card is turned on and the correct personal identification code is entered into the smart card, and with the CD ROM inserted into a storage medium reader or drive 22, the challenge-response process is ready to begin.

Initially, the user would input a four digit or character personal identification code (PIC) into the smart card 24 via the keyboard 28. It is noted that the exact number of digits of the PIC is sized commensurate with the degree of protection sought and could consist of alphanumeric characters. The integrated circuit or microprocessor chip provided in the smart card contains the user's system identification code that will enable the computer or information processing device identify the authorized user of the PAD. Typical system identification codes 34 are shown in the illustrative storage medium's access/information management control devices index table with respect to FIG. 4. Although the authorized user's security identification code consists of a two-digit zone access code, and a six-digit system identification code, the exact number of digits employed, as well as the use of alphanumerics can be modified based upon system needs and preference. The code is displayed on 30 of the smart card. Once the security identification code is displayed on the smart card 24, the user enters it into the computer or information processing device 20 via keyboard 18. At this point, the corresponding zone access code is searched for in the index table to find out if the storage medium or media contains stored material for that zone access code's privileges. If the corresponding zone access code is missing from the storage medium's or media's index table(s), then a message will be displayed on the computer or information processing device screen 20 indicating that access is denied. If the zone access codes match, then the computer or information processing device verifies that the accessor may have privileges to material stored on the CD ROM(s) and will look up the paired personal security key 38 stored on the CD ROM to determine if the user is the owner of the PAD. To ensure that the security aspect of the present invention is as inclusive as possible, the personal security key can be encrypted directly in the CD ROM. The zone access code 32 corresponds to the particular logical zones assigned to one or more authorized users. For example, as shown in FIG. 4, a Zone Access Code (ZAC) of 33 corresponds to the logical zone 36 portion of the index table indicating that for logical zones 10 and 11, a maximum of nine authorized users will be allowed access.

Any one of the logical zones on the CD ROM can contain one or more databases or other material and therefore each logical zone is of varying size. Therefore, as shown, for example, any one of the zone access codes can be assigned to one or more users, who in turn, can be assigned individualized system identification codes associated with that zone access code from the total of up to 1,000,000 unique code numbers available for a six digit code. Certainly, if more user codes are required, alphanumeric characters can be used or the number of characters of the system identification codes 34 can be increased.

To further the example, a special logical zone can be set aside to control the downloading of data from the storage medium or media. As shown in FIG. 4, the zone access code 32 value of 01 corresponds to logical zone access privileges 1, 9, 26. Zone access code 02 gives authorized users access to the same three logical zones of 1, 9, 26, but the addition of logical zone 99 enables the authorized user to download the stored material. Without logical zone 99 privileges, an authorized user could not perform downloading. Also, downloading privileges can be assigned to one or more but not to all the logical zones to which a user has privileges.

Once the zone access code and system identification code are entered and accessed and matches confirmed, the personal security key code paired with this system identification code is utilized to verify that the user is not just the possessor but indeed the true owner of the PAD.

A random number generator provided within the computer or information processing device 20 generates a random number, such as a four-digit number, which is displayed by the computer or information processing device and serves as a challenge to the smart card 24. The user depresses the challenge key 38 and enters the random number into a smart card 24 using the keypad 28 and then depresses the enter key 40. An identical or cooperating encryption/decryption algorithm separate or incorporated within a processor chip and personal security key provided in both the computer or information processing device 20 as well as the smart card 24 performs an operation on the random number. The response to the challenge by the smart card is displayed and this number is entered into the keyboard 18. The computer or information processing device then compares this result with the result that it generated utilizing the CD ROM transmitted personal security key which is paired to the system identification code. If these two results are identical, access to the particular logical zones corresponding to the zone access code 32 would be allowed to that particular user.

This type of system would allow the CD ROM to be distributed among a number of authorized users for material retrieval, allowing each user access potentially to all or to only a discrete portion of the information included in the CD ROM, according to each user's access privileges.

Figure 5:
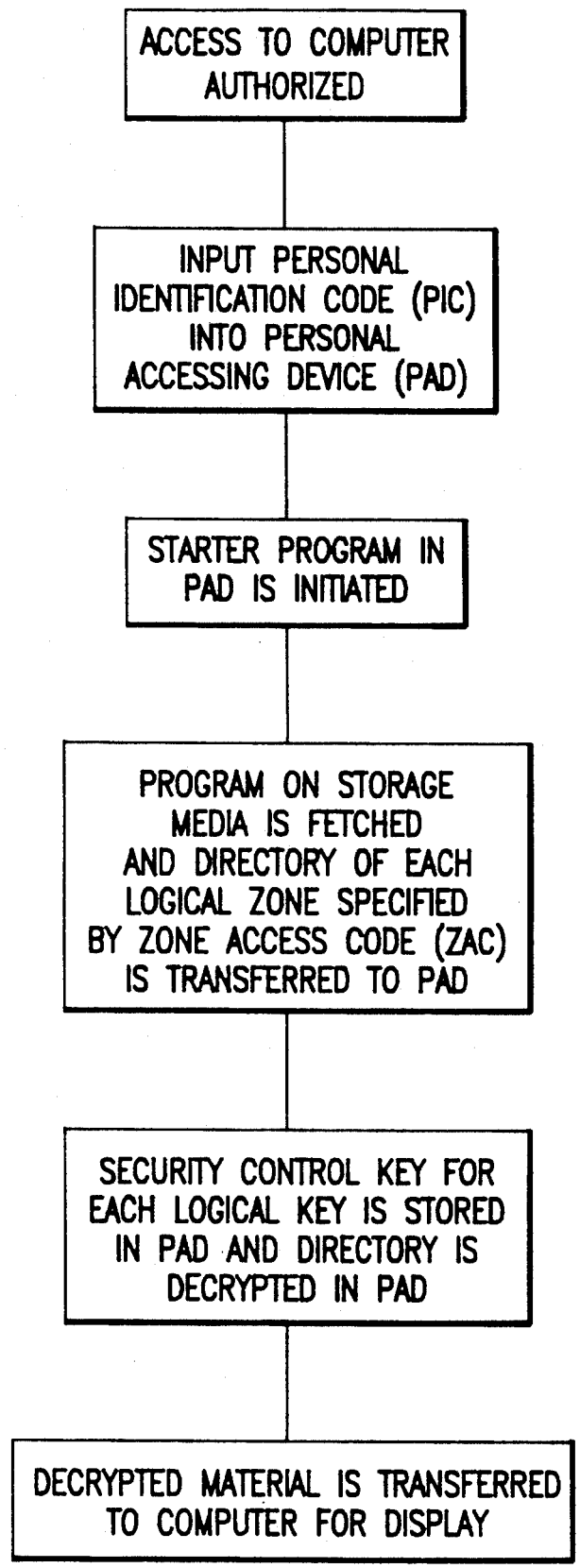
FIG. 5 is a flow diagram of a second method of granting display and retrieval of material recorded on the storage media.

Alternatively, as illustrated with respect to FIG. 5, the material provided on the storage media can be encrypted/decrypted utilizing the personal access device. Storage media and the access/information management control device can be initially organized or dynamically re-organized during the operation of the computer to include one or more logical zones for the user's or users' material, a logical zone or zones to store any software that is to be recorded on the storage media, and one or more logical zones for the management control information. In this embodiment, the security transactions are performed within the smart card PAD for maximal security since it is located closest to the user. When a user is authorized access to the computer or information processing device, by any method, the personal identification code (PIC) is entered, the smart card is activated, and the "starter program" is initialized. This "starter program" released by the smart card PAD fetches a program stored on the secure storage media and also signals the secure storage media via the computer to transmit the directory of each logical zone specified by the zone access code (ZAC) stored in the smart card. The security control key for each logical zone is stored in the smart card and the retrieved directories of each addressed logical zone are decrypted in the smart card and transmitted back to the computer for display. The user then engages in search and retrieval and indexing activities. The retrieved user material is decrypted by the security system within the smart card and transmitted back to the computer for temporary storage, use and display. Since the security system within the smart card is maximally secure, this technique overcomes the vulnerabilities of current microcomputer design, whereby activity on the backplane or bus of the computer can be possibly monitored and the security compromised.

The CD ROM or any type of storage media which is utilized would operate in conjunction with search and retrieval and indexing software stored in a number of ways such as on the CD ROM or on the computer's or information processing device's non-volatile memory. If it is stored on floppy disks or other reusable media, such as the computer's hard disk, these media can be updated as necessary to detect and deactivate outdated, duplicated or lost personal accessing devices, such as smart cards, which are presented for system access. An added feature could be that if a reported lost smart card 12 was used to gain access, and the computer or information processing device 20 determined it was a lost smart card, a "killer" challenge code could be displayed, which when entered into the smart card would deactivate the device.

As illustrated in FIG. 1, an automatic reader 16 can be employed instead of manually inputting the information onto the smart card 12 or the computer keyboard by the human reader. In this instance, the smart card 12 and the computer or information processing device 20 would after the correct personal identification code is given, engage in its dialogue automatically to determine whether access by the accessor would be allowed.

Figure 6:
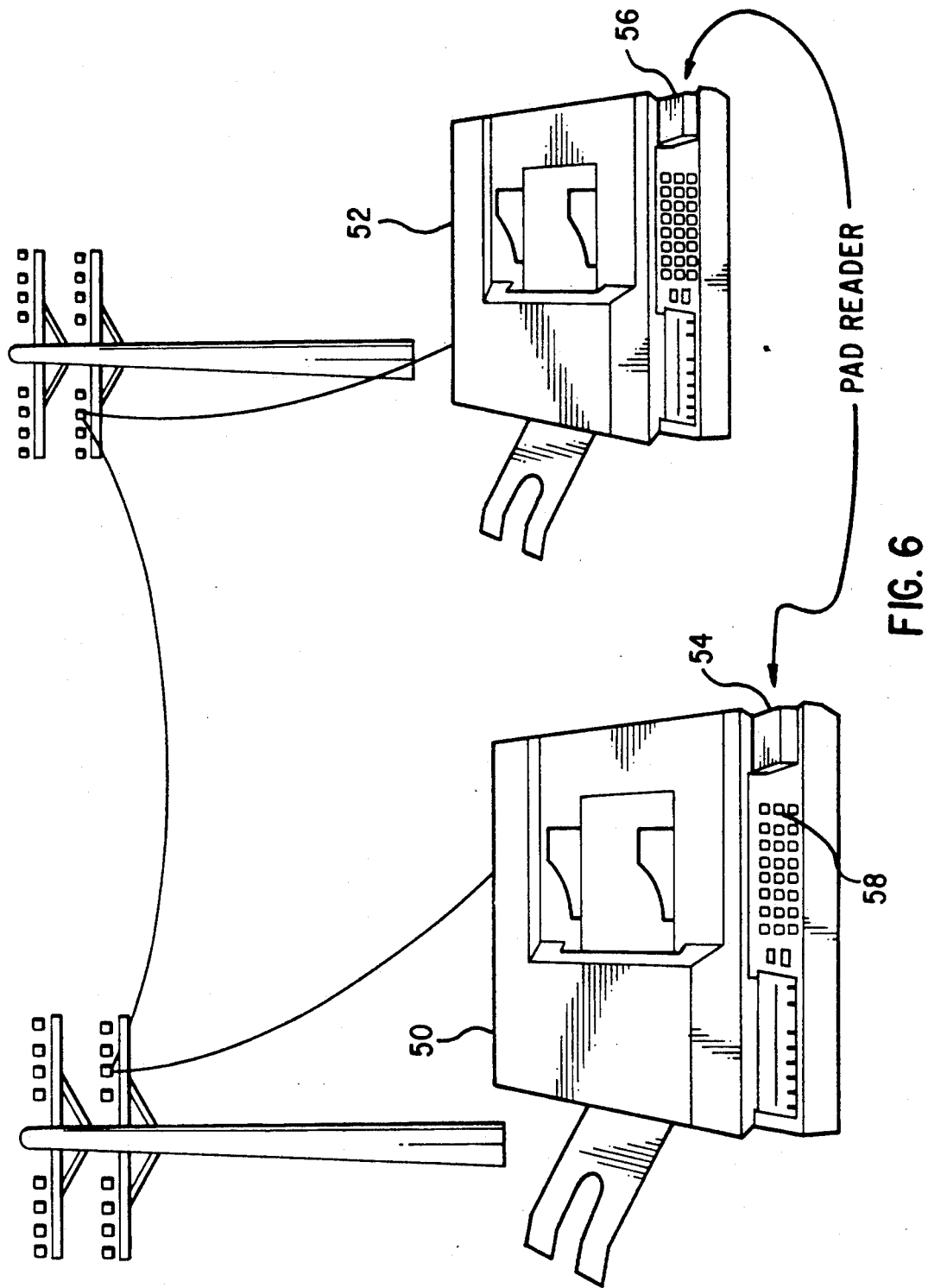
FIG. 6 is a diagram showing the use of the present invention in the field of facsimile transmissions.

Although the present invention has been described, up until this point, with respect to retrieving material provided in a storage medium or media included in a single computer, the invention can be extended to a computer system embedded in a second device or system. In this embodiment, a computer system or microprocessor, with or without additional memory, input/output channels, peripheral storage devices, etc. is combined with another device or system. When the security aspect of the combined device or system is not active, the operation of the original device or system functions without the restrictions or controls imposed by the present invention. For example, as illustrated with respect to FIG. 6, the teachings of the present invention can be embedded within a facsimile (FAX) device or store-and-forward facsimile message system to yield a secure computerized FAX (SCFAX). The SCFAX permits one, several or many users who are sharing the FAX device or system to retrieve the secure messages upon demand. For non-secure messages, the FAX device or system would operate as it does normally, printing out messages as they are received or scheduled and the users would sort through these messages to select their own. While using the SCFAX system, recipients are dynamically assigned on demand or by pre-arranged design, unique logical zones for the secure messages. Attached or built into each SCFAX terminal 50, 52 is a smart card reader/writer 54, 56. Each user of the SCFAX is issued a smart card PAD which is used as an identification and access device. Alternatively, the SCFAX terminal can be used with a smart card PAD where the recipient acts as the reader, or with another type of PAD, such as a magnetic stripe card.

The SCFAX communications system would operate as follows. The sender (i.e., an organization or an individual) loads a particular message/document to be transmitted into the SCFAX communications system or device through a computer terminal or facsimile terminal, and inserts or prompts the insertion of the sender s smart card into the smart card reader 54. The sender then inputs the individual's or organization's smart card PIC through a keyboard/keypad, voice recognition system, or other input device or system capable of recognizing and interpreting alphanumeric characters or phrases 58. Upon input of the correct PIC, the smart card PAD is activated and a "starter program" is initialized. The sender then dials the recipient's communications address, or requests the system to validate and identify, generally through a system directory, an appropriate SCFAX communications destination address (e.g., a telephone number) for delayed, scheduled or immediate transmission to the recipient. At the time the connection is made to the recipient's station or to an intermediate storage system (i.e., for store-and-forward facsimile services), the normal FAX management information is exchanged and the sender's desired mode of secured communications, as identified by the initial smart card data and recipient's code number or public encryption key, notifies the recipient's terminal 52 or intermediary storage device that the transmitted message/document is to be stored securely and only will be released to the specified recipient. If the recipient's unique code number or public encryption key is listed in the receiving device's or intermediate storage SCFAX directory, the name or other unique identifier of the recipient is then transmitted back to the sending terminal or intermediate storage system (for store-and-forward FAX) for sender verification.

After the computing system, or the sender in the case of point-to-point (PTP) intermediate communications, matches and confirms that the intended recipient is logged-on and available to the receiving terminal, transmission occurs from the sending SCFAX terminal or from the intermediate store-and-forward storage system or from the recipient's SCFAX (receiving terminal). As a protection feature, if some preset number such as three successive incorrect codes for the recipient are entered, an internal smart card PAD protect program places the smart card in the alarm and rejection mode and subsequent transmissions are not possible. Clearing of this mode can be performed by an authorized designated source. The message can only be released at the recipient's terminal, i.e., imprinted or visual form, when the recipient has physically placed his smart card into the smart card reader and has successfully entered the correct PIC.

In another embodiment of the present invention which is less secure than using a smart-card PAD, either the keyboard or keypad 58 of the FAX terminals or devices could serve as the sender's and recipient's PAD. This embodiment is susceptible to visual eavesdropping and lacks the entire element of protection offered users who possess their own PAD. This embodiment embraces what a user knows, but does not use the other protective element of what a person has (a PAD) nor does it permit the added element of protection of what a person is (a biometric measure).

Another example of an embedded application for the present invention would include the range of services commonly known as store-and-forward voice services or "voice-mail" where voice communications are transmitted by the sender at will and the system delivers the message based upon a set of design conditions. The present invention is applicable to this type of information delivery and to "E Mail" or electronic mail message services, also achieving delivery of information without both sender and recipient interacting in concurrent or simultaneous exchanges of information. Similarly, the invention may be embedded in current and new configurations and architectures for store-and-forward data communications, where messages are originated and transmitted from the sender's station without knowing the recipient is available at any particular receiving station.

At such store-and-forward applications, the recipient identifies his physical location dynamically by a variety of sign-on procedures so that the system directory can identify where to send information generated for each recipient. The above system embodiments are also appropriate to systems where a single sender may wish to transmit identical information to more than one recipient (point-to-multipoint communications).

Another level of security is achieved by the way the scanned information is transmitted to the receiving SCFAX. For low level applications, the scanned document is transmitted in a normal manner and the received message is recorded in a logical zone already existing for each recipient, or dynamically created at transmission time, on the SCFAX storage medium or media. As more messages are received for that party, additional space is automatically allocated to the recipient's logical zone.

For higher security applications, each scan line along with the control information can be specifically encoded and then encrypted by the sender's smart card using the recipient's public encryption key or any encryption/decryption schema dependent upon the environment, be it unclassified, or not. The encrypted message/document is then transmitted and stored in the recipient's logical zone on the SCFAX storage medium or media or within the store and forward storage media.

When the recipients want to retrieve messages, they insert their smart cards into the SCFAX readers, input their unique PIC's using the SCFAX keypad, a keyboard, or voice recognition module, and if the PIC is correct, the smart card can retrieve a summary directory of the logical zone and display or print a message at the SCFAX unit, such as "3 messages, total 17 pages." As explained hereinabove, three incorrect tries to initiate the smart card PAD could result in an alarm and rejection mode condition. The recipient can either have the messages outputed at this point or as an interim step can depress a control key to output a summary listing of all his messages. The summary lists each message/document by identifying number and indicates information such as who it is from, the time it was received, and how many pages. The recipient can then have all the messages/documents printed out or can selectively pick out only which ones he wants at that time to have outputed by listing the appropriate identification numbers. The recipient's smart card then uses the internally stored encryption key to decrypt the messages/documents for output.

Figure 7:
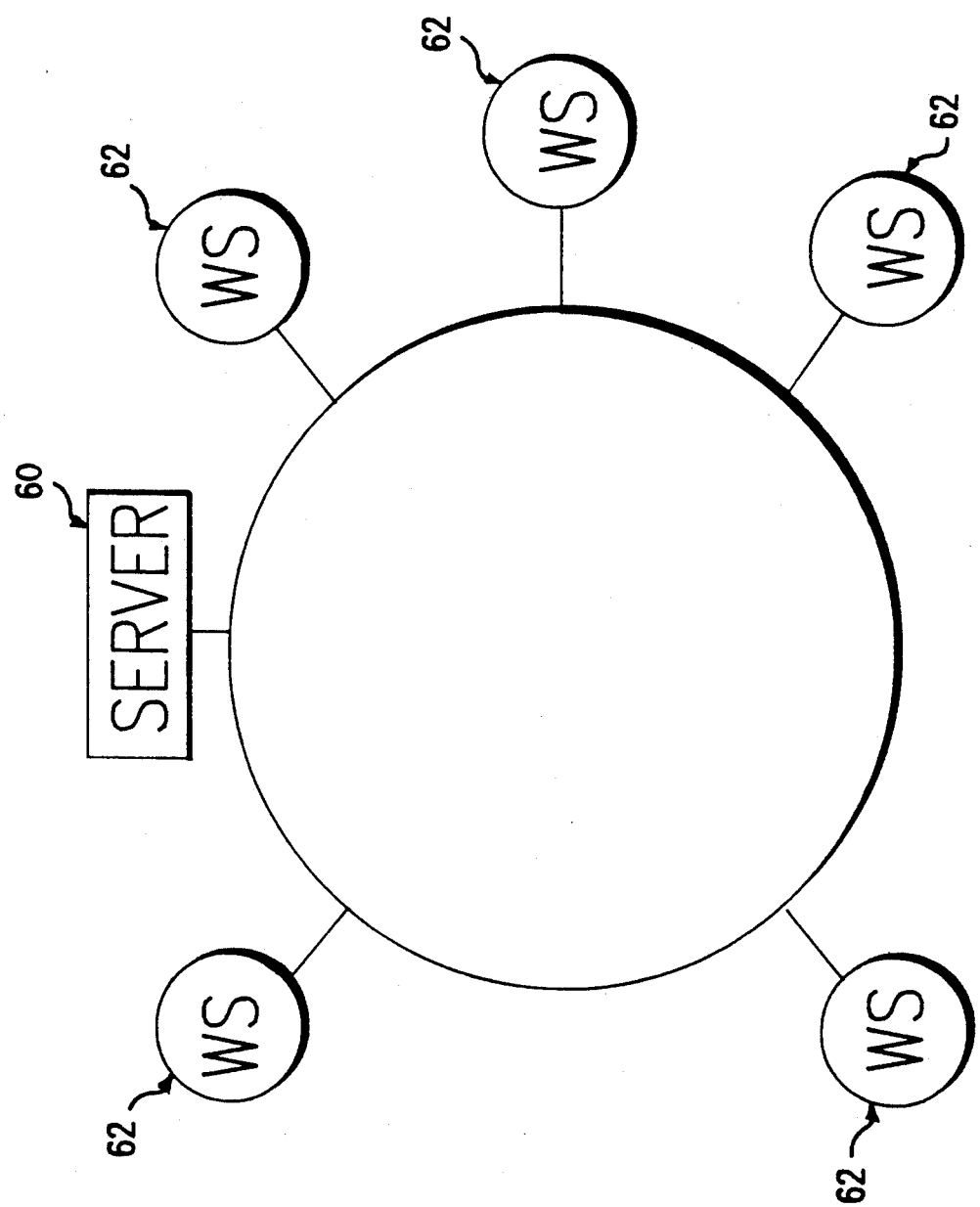
FIG. 7 and 8 are diagrams showing the use of the present invention in various communication networks.
Figure 8:
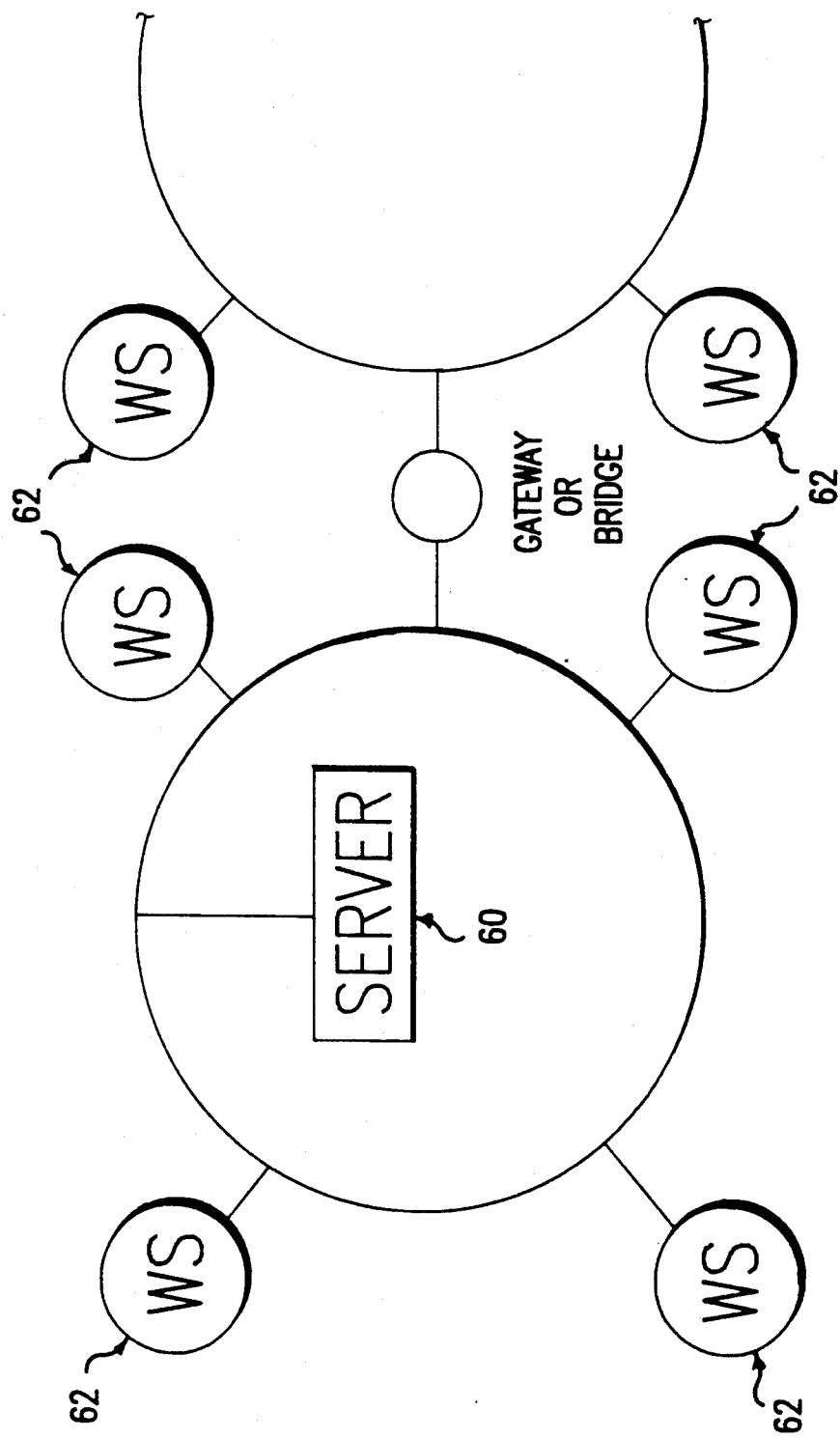

FIGS. 7 and 8 illustrate the application of the present invention to local area networks, wide area networks and point-to-point/point-to-multipoint communications. In these systems, various users and computers are interconnected to one another by fiber or wire for electronic or optical communications, or a wireless system whether by satellite or terrestrial means. Security storage media can be controlled at a transmission site, receiver site, network file server and from any of a plurality of work stations.

For purposes of explanation, consider a LAN wherein the secure storage medium is controlled from a file server 60 which would include a secure storage medium having an index table such as shown with respect to FIG. 4. A user of the LAN is currently using non-secure data and then has need to access certain secure material. The user inserts his smart card PAD in the smart card reader of one of the work stations 62 (see FIG. 7). The user would then key in his PIC from the computer keyboard and the smart card starter program is executed. The user selects the secure storage system selection from the work station's displayed menu of options and the smart card transmits his encrypted security identification code to the file server. The file server checks to ensure that the user has privileges on the secure storage medium or media. If a match is found for the user's security identification code, the file server then transmits the directory of each logical zone that the user's security identification code's ZAC has specified as user privileges. The directories could have been stored in clear or encrypted text. If encrypted, the file server uses its system encryption key for each logical zone, decrypts each directory, and then re-encrypts each directory using the user's personal security key. The encrypted directories are transmitted to the work station and are decrypted by the user's smart card using the identical personal security key which is stored in the smart card. The user selects the databases, files, or other materials he both wants and is authorized to address, and sends this information back to the file server. The file server decrypts the user material from the secure storage media and if the user does not have down-load privileges, he uses his work station to communicate the search and retrieval and indexing activities he wants the file server to perform. If the user does have down-loading privileges for one or more logical zones, that user material can be transmitted encrypted, using the user's personal security key, to the user's work station.

As a further example, public key encryption (PKE) can also be used. Whenever the file server is about to transmit user material to the user's work station, the file server uses the system key to decrypt the material and then using the user's public encryption key (PbEK) to re-encrypt the material before transmitting it to the work station where it is decrypted in the smart card using the user's stored private encryption key (PrEK). This invention could also be used to transmit, store, protect and permit access to messages/documents containing any type of information such as text, data, images, graphics, voice, audio, video and analogs to users on the LAN, WAN or PTP communications or to users and other similar networks who receive the information or media sent by physical delivery means.

Public key encryption can also be used to protect and transmit materials stored in logical zones and secure storage media at the user's work station, to other users on the network or to users on other interconnected networks.

Another embodiment of this invention, machines as well as people, can interface with machines in the secure transfer of information products such as data and databases, messages and other textual information, graphics, tables, analogs such as maps, facsimiles of all manner of transmitted materials, audio such as speech or voice and music, video, images, photographs or the like. In these embodiments, the protected material could have been stored in unencrypted form if the sensitivity of the material was such that encryption was not necessary, and the steps of encryption and decryption are automatically bypassed as determined by the PAD's secure program.

The present invention allows for remote metering by programming the smart card PAD's to allow authorized users a specific number of information retrievals from one or more specified logical zones or to operate with these logical zones for a specific time period, such as a specified number of minutes, a day or even weeks or months. This data availability feature is useful to limit and control user privileges, such as for employees and subscribers. It also encourages and permits new information distribution services whereby information providers are assured of usage-based revenues even though the storage media are not connected to a central computer. For authorized users who have the type of smart card PAD for which the user serves as a smart card reader, a courier, mail or personal telephone service can be employed to send the user an updated code that is entered as part of a re-initialization routine to renew or update user privileges. For smart cards that use an electromechanical or other type of reader/writers, update codes can be transmitted by fiber or wire for electronic or optical communications, or wireless whether by satellite or terrestrial means to the user's computer system to update the access privileges.

For remote users, it is also possible to update the storage media's recorded material that was sent to the user. For example, a service that distributes databases on CD ROM's to remote subscribers or other users could have supplemental materials supplied to them as part of an update service. A recording medium such as a Write Once Read Many (WORM) device or the computer's magnetic memory can be used to record update material which is transmitted by fiber, wire or wireless to remote users. The user's smart card is used to filter from the transmitted material only those materials that are in the logical zones for which the user has privileges. Also, while the central source is communicating with the recipient's smart card during normal update activities, the recipient's smart card can be interrogated to determine such things as how many accesses or length of time the smart card was in use, in order to appropriately bill the user.

In situations where a user reports that his PAD has been lost, management can engage a program which can detect a reported "lost" PAD as being used to try to gain access to a protective storage medium. For magnetic stripe PAD's, the system can erase the information recorded on the magnetic stripe. If the lost PAD is a smart card, the computer can send back a challenge or identity code which the smart card will determine is the signal to deactivate itself, whenever the PAD is communicating with the computer as part of a "dialogue." If this invention is used in situations in which the users can be subject to harm if they did not provide the correct PIC to activate the smart card, an alternate PIC can be issued to the users which will link to a special security identification code which will provide logical zone privileges for only non-secure user material or materials specifically prepared for this purpose. Additionally, once the alternate PIC is used, the original PIC would be deactivated automatically so that the original privileged user logical zones are no longer available.

The present invention could also be used to provide protection for commercial databases or other materials, obtainable for a fee via a pay for use telephone service. Databases can be maintained in logical zones on computer systems which are time shared. Subscribers can purchase permission privileges to one or more logical zones and also be charged uniquely for the amount of time and time of day when they were on-line with the computer service, as well as the type of service and for other special computer services used. This information is recorded on the smart card PAD's protected memory and down-loaded periodically to the computer service for billing purposes. This unique process greatly simplifies data processing and administration of billing and allows pre-paid access changes at discounted rates to encourage new services.

The present invention contemplates the use of any number of encryption algorithms. In this context, public key encryption (PKE) can be used alone or in conjunction with other security techniques. For example, a challenge-response technique can be used as an initial barrier to a user. If the user could not pass this initial test, the system would render itself useless. If this test was passed successfully, then public and private encryption keys could be employed in the actual transfer and decryption of the retrieved material. If a user passes the challenge-response test, then the same smart card PAD, alone or in combination with a second or multiple number of smart cards, can also be used for the PKE operation. The material the user requested is down-loaded from the secure storage medium, decrypted using a system security key and then re-encrypted using the user's public encryption key. The encrypted material is then sent to the user either by a local area network (LAN) or directly from the work station's secure storage medium and is transmitted to the user's smart card which employs its stored private encryption key to decrypt the retrieved data which are then sent back to the computer for use and display. Public key encryption can also be used to protect and transmit materials stored in logical zones of secure storage media at the user's work station, to other users on a local or wide area network, or to users on other interconnected networks and point-to-point communications.

User access privileges can be given, denied an altered at the user's site at anytime. New employees can be given customized information retrieval privileges, which are automatically timed for "short time," or "long time" action as determined by the smart card PAD's internally controlled time settings. Current employees can have their access privileges expanded or contracted, and departing employees can have all of their privileges revoked instantly. All of these privilege changes can be accomplished without modifying any of the material recorded on the secure storage medium. User privileges can be removed or altered by taking away a person's PAD or by exchanging a user's PAD with one that has the desired privileges, or by changing the security identification code in the user's existing PAD so that a new zone access code has the desired user privileges.

The size and distribution of the contents of each logical zone are dictated by the amount of material being stored and by the type of media. For distributions of recorded material, such as on permanent storage CD ROM's, all the material within each logical zone is stored in proximity with one another to take advantage of faster seek times. For erasable storage media, such as magnetic and magnetic-optical, user material of varying lengths which would be stored in available space as part of a dynamic storage management process of assigning new authorized recipients and their information retrieval privileges in the system's access/information management control device, and dynamically assigning new variable length logical zones for storing material when it is received, recording it in the assigned logical zones and then erasing it when necessary.

Multiple system identification codes with "paired personal" security keys can be given to each user to further thwart an intruder who might be able to plant a device to monitor the bus or backplane of a computer and gain information about the user's security access codes and keys. Within the user's smart card PAD and also recorded on the secure storage medium are an exact matching set of unique system identification codes (SICs) with "paired—security" keys for a specific zone access code as illustrated for one authorized user with respect to FIG. 9. The organization security staff may permit the same SIC's and paired personal security keys to be sequenced again and again or may re-initialize the user's smart card with a new set of variable codes on a periodic basis. In operation, each time the user starts using the system, the next SIC would be sequenced along with the paired—security key.

Depending on the level of security designed into the system, the stored user material can range from unencrypted, to scrambled, to encrypted form. The security of the user material is also established by controlling the permissions within any logical zone. In a timeshared system or a store-and-forward system for voice and message communications, where logical zone control over the user material and physical control over the storage media can be maintained in both the system level and the recipient device level, the level of security may be deemed adequate for the system to have unencrypted user material. One advantage for doing this is to save the time and cost of encryption and decryption. It may also be desired in certain applications to mix unencrypted and encrypted material together in the same system.

As described in this application, the present invention presents a very flexible system which can have from one to at least 16 levels of management protection relating to controlled access, controlled addressability, information management control and security. The invention can use many public and proprietary encryption systems and can be retrofitted easily into existing systems without affecting their operation when the security and operation of the invention is not being used.

The lowest level of management protection is obtained when non-encrypted material is stored in logical zones and the PAD is a simplistic device such as a keypad or keyboard which are part of the computer system. If a magnetic stripe card is used as a PAD, two levels of management protection are present because it involves the use of one or two passwords which the user must know and the magnetic stripe card which the user must have in order to gain access to the system. A third level of management protection is achieved if the user's material is encrypted. A fourth level of management protection is achieved if the PAD is a smart card and the decryption and security log-on are performed within the smart card. A fifth level of management protection is achieved if biometrics are used to identify the user. A sixth level of management protection is achieved by using logical zones as mutually exclusive variable length storage areas to separate user material based on a "need to know" and a control mechanism. A seventh level of management protection is achieved by controlling user down-loading privileges for each of the logical zones for which the user has privileges. An eighth level of management protection is that users can only see and use the directories for the logical zones for which they have access privileges. A ninth level of management protection is the employment of metering techniques within the smart card to limit both the number of accesses and/or a specified time period during which the smart can be used. A tenth level of management protection is the use of one or more encryption systems. For example, DES can be used in a challenge-response technique to determine if the holder of the smart card is the real owner. Furthermore, the question of real ownership may have to be additionally determined several times during the course of the privileged activity. No user material would be transmitted until this step is confirmed. Then, the same smart card or an additional smart card can be used with public key encryption to control the transfer of user material from the secure storage medium to the user's device. An eleventh level of management protection is that all the management control material, systems software, and user material can be stored on the storage medium in separate logical zones. A twelfth level of management protection is the ability to issue each user a new PAD based on a "need to know" and to be able to expand or reduce the user's permission privileges either before or after the storage medium is recorded. A thirteenth level of management protection is the ability to disable a user's PAD if the PIC is entered incorrectly a preset number of times. A fourteenth level of security protection is that reported lost PAD's which are not returned by former subscribers or employees, can be disabled if they are ever used again. A fifteenth level of management protection occurs if PAD's are attempted to be used beyond their authorized privileged time period after which time they are disabled. A sixteenth level of management protection is that the system software can be controlled in a variety of ways such as resident in plain text on the computer system's permanent storage yielding a low level of protection, or resident on the secure medium or media in either plain text or encrypted form for higher levels of protection, or encrypted on the secure medium or media but will only be fetched for operation when it is addressed by a "starter program" that is stored in the user's PAD and then transmitted by the PAD only after the correct PIC is entered.

While the invention has been illustrated in some detail by various examples, according to the preferred embodiments shown in the accompanying drawings, there is no intention to limit the invention to such detail. On the contrary, it is intended to cover all modifications, alterations and equivalents falling within the spirit and scope of the appended claims.

What is claimed is:

1. A security system for granting user entities access, according to their uniquely assigned privileges, to material stored in logical zones on any form of storage medium, and to permit user entities to manage, operate upon and communicate, as enabled by those assigned privileges, both secure and selective materials in said logical zones provided by one or more storage entities, said system comprising:

a wired or wireless communications network provided with two or more nodes, at each of which node an operation or procedure can be performed;

at least two computer processing and storage entities containing storage medium or media, each of said computer processing and storage entities connected to said communications network;

said storage entities containing storage medium or media allowing erasable or non-erasable formatting and recording with stored material into a plurality of information storage and retrieval and management control and user entity material logical zones, each of said logical zones provided with particular material therein, said storage medium or media directly provided thereon with an access management control means for indicating which of said user logical zone or zones on any of said storage medium or media the user entity will be allowed to access and perform the selective privileged operations of reading, writing, replacing, deleting, modifying and communicating based upon access request information provided to the system by the user, said access management control means provided in each said storage medium or media at a location remote from, and non-contiguous with, said user logical zones;

means in each storage entity for selectively reading material provided in said plurality of logical zones as well as material provided in said access management control means of said storage medium or media or for selectively creating, modifying or deleting logical zones and selectively reading, writing, replacing, deleting and modifying the content of material provided in said plurality of logical zones as well as material provided in said access management control means of said storage medium or media;

a personal accessing device;

a means for providing an interface coupling for exchanging information between said personal accessing device and at least one of said computer processing and storage entities, said personal accessing device containing a security identification code to enable said personal accessing device to be in communication with any of said computer processing and storage entities for transmitting said security identification code to said computer processing and storage entities;

a means for disabling said personal accessing device if an incorrect personal identification code is entered more than a predetermined amount of times;

wherein said security identification code is compared or operated upon in any of said computer processing and storage entities to said access management control means provided on said storage medium or media to determine the particular user logical zone or zones to which the user is allowed access and other privileged operations.

2. The security system in accordance with claim 1 wherein said means for interface coupling is provided with means for presenting information and wherein access management control means information controlling logical zones and user entity data contained within logical zones can be transmitted to any of said computer processing and storage entities connected to said communications network, whereat designation of logical zones and information therein can be created, recorded and dynamically updated.

3. The system in accordance with claim 2 in which said personal accessing device incorporates a means of selective transaction monitoring and data collection of usage of logical zone material comprising items such as type of material accessed, type of operations performed, grade of service initiation and disablement and termination of service and time and frequency of usage.

4. The system in accordance with claim 3 further including a means for billing the user based upon interrogating said personal accessing device to determine history of usage.

5. The security system in accordance with claim 1, wherein said personal accessing device is provided with a means for encrypting and decrypting material.

6. The system in accordance with claim 1 further including a means for billing the user based upon interrogating said personal accessing device to determine history of usage.

7. The system in accordance with claim 1 in which said personal accessing device incorporates a means of selective transaction monitoring and data collection of usage of logical zone material comprising items such as type of material accessed, type of operation performed, grade of service, initiation and disablement and termination of service and time and frequency of usage.

8. The system in accordance with claim 7 further including a means for billing the user based upon interrogating said personal accessing device to determine history of usage.

9. A security system for granting user entities access to materials provided on a storage medium or media, said system comprising:

a computer system including at least one computer and means for presenting information;

a storage medium or media capable of erasable or non-erasable formatting and recording with stored material into a plurality of information storage and retrieval and management control and user entity material logical zones, each of said logical zones provided with particular material therein, said storage medium or media directly provided thereon with an access management control means for indicating which of said user logical zone or zones or any of said storage medium or media the user entity will be allowed to access and perform selective privileged operations of reading, writing, replacing, deleting, modifying and communicating based upon access request information provided to the system by the user, said access management control means provided in each said storage medium or media at a location remote from, and non-contiguous with, said user logical zones;

means in each said computer system for selectively reading material provided in said plurality of logical zones as well as material provided in said access management control means of said storage medium or media or for selectively creating, modifying or deleting logical zones and selectively reading, writing, replacing, deleting, modifying and communicating the content of material provided in said plurality of logical zones as well as material provided in said access management control means of said storage medium or media;

a personal accessing device;

means for providing interface coupling for exchanging information between said personal accessing device and said computer system, said personal accessing device containing a security identification code, to enable said personal accessing device to be in communication with said computer system for transmitting said security identification code to said computer system;

wherein, said security identification code is compared to or operated upon said access management control means provided on said storage medium or media to determine the particular user logical zone or zones to which the user is allowed access for purposes of selective privileged operations based upon the content and storage requirements of material provided in said user logical zones.

10. The security system in accordance with claim 9, wherein said personal accessing device is provided with a means for encrypting and decrypting material.

11. The system in accordance with claim 9 further including a means for billing the user based upon interrogating said personal accessing device to determine history of usage.

12. The system in accordance with claim 9 in which said personal accessing device incorporates a means for selective transaction monitoring and data collection of usage of logical zone material comprising items such as type of material accessed, type of operations performed, grade of service, initiation and disablement and termination of service and time and frequency of usage.

13. The system in accordance with claim 12 further including a means of transferring selective transaction monitoring and data collection information onto the access management control logical zones of the storage medium or media for physical return or electronic interrogation to retrieve billing and usage history information.

14. A method of granting user access to, and information management and control over material provided on a storage medium or media, with a means for reading or reading and writing on said storage medium or media connected to a computer system including at least one computer having means for presenting information, said storage medium or media containing one or a plurality of information management control and user material logical zones, comprising the steps of:

assigning security identification codes to all users allowed access to the storage medium or media;

preparing access management control means for indicating to which of said user logical zone or zones a particular user is allowed access and selective privileged operations corresponding to said security identification code or codes, said access management control means provided in a personal accessing device;

encrypting access management control means and user material and recording said encrypted access management control means and user material directly on the storage medium or media by using any type or combination of types of encryption/decryption methods;

enabling said personal accessing device by utilizing the user's correct personal identification code;

transmitting a starter program stored in said personnel accessing device or in a means for providing interface coupling for exchanging information between said personal accessing device and said computer system or on the storage medium or media to said computer system and fetching search and retrieval programs stored on said storage medium or media to said personal accessing device;

determining if said search and retrieval programs are encrypted;

decrypting said search and retrieval programs, if appropriate;

requesting the directories of the user logical zone or zones to be transmitted from said storage medium or media to said personal accessing device based upon information provided in said secure user management means;

determining if said requested directories are encrypted;

decrypting said requested directories if they are encrypted;

displaying said requested directories on said means for visually presenting information;

requesting and transmitting to said personal accessing device the user material stored on said storage medium or media in the user's privileged logical zone or zones based upon said requested directories;

decrypting said user material in said personal accessing device; and transmitting the decrypted material back to the computer for use.

15. The method in accordance with claim 14 further including the steps of disabling said personal accessing device if an incorrect personal identification code is entered more than a predetermined number of times.

16. The method in accordance with claim 15 further including the step of initiating one or more alarms if an incorrect personal identification code is entered.

17. The method in accordance with claim 14, wherein said search and retrieval programs are decrypted in said personal accessing device.

18. The method in accordance with claim 14, wherein said requested directories are decrypted in said personal accessing device.

19. The method in accordance with claim 14, further including the step of assigning the user logical zone or zones to which a particular user is granted selective privileged operations upon the content and zone storage requirements for specific user logical zones, based upon the security identification code assigned to each user.

20. The method in accordance with claim 14, further including the step of determining which operational privileges the authorized user has been assigned, based upon the security identification code assigned to each user.

21. The method in accordance with claim 14, wherein new user material is encrypted within said personal accessing device and transmitted to, and stored in the appropriate logical zone or zones on said storage medium or media.

22. The method in accordance with claim 14, wherein all of the material provided on said storage media or medium is encrypted using any type or combination of types of encryption/decryption methods.

23. The method in accordance with claim 51, wherein said encrypted material is transmitted to said personal accessing device, and then decrypted in said personal accessing device using an encryption key stored in said personal accessing device for each of said logical zones, said decrypted material being retransmitted to the computer for use.

24. The method in accordance with claim 23, wherein material provided in the user's logical zone or zones is dynamically and remotely updated.

25. The method in accordance with claim 24 wherein only updated material belonging to a particular user's privileged logical zone or zones is encrypted/decrypted in the user's said personal accessing device using the user's encryption/decryption key or keys and then transmitted to the computer system for recording in the secure storage medium or media.

26. The method in accordance with claim 25, wherein the computer system is provided as part of a communications network.

* * * * *

UNITED STATES PATENT AND TRADEMARK OFFICE
CERTIFICATE OF CORRECTION

PATENT NO. : 5,191,611
DATED : March 2, 1993
INVENTOR(S) : Gerald S. Lang

It is certified that error appears in the above-indentified patent and that said Letters Patent is hereby corrected as shown below:

Column 20, line 32 change "51" to --22--.

Signed and Sealed this

Fourth Day of January, 1994

Attest:

BRUCE LEHMAN

*Attesting Officer*   *Commissioner of Patents and Trademarks*